Nov. 23, 1937.  R. T. HEDFIELD ET AL  2,099,899
THERMOMETER
Filed Nov. 4, 1936  2 Sheets-Sheet 2

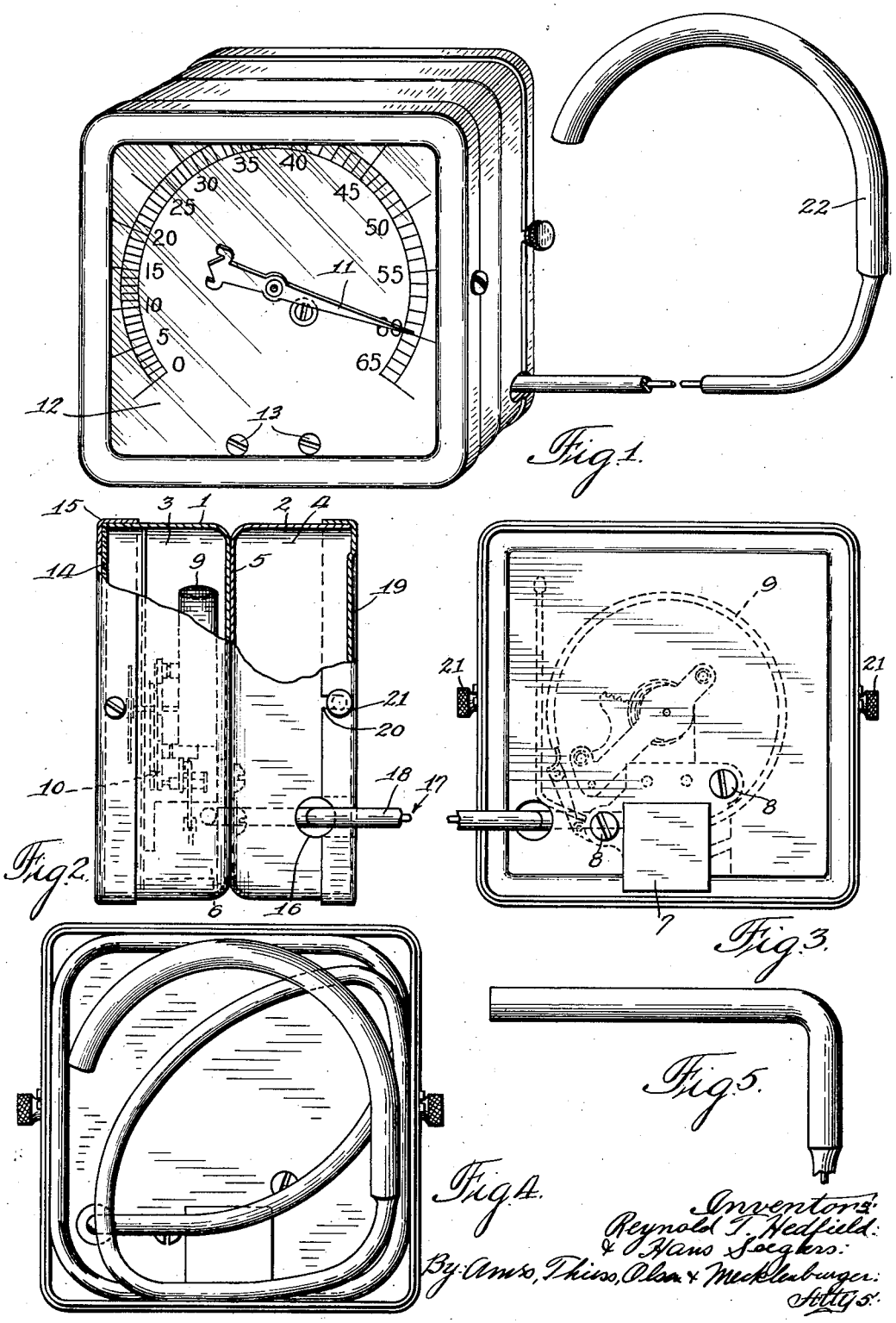

Inventors
Reynold T. Hedfield
& Hans Seegers
By Amro, Thiess, Olsen & Mecklenburg
Attys.

Patented Nov. 23, 1937

2,099,899

UNITED STATES PATENT OFFICE 2,099,899

THERMOMETER

Reynold T. Hedfield and Hans Seegers, Chicago, Ill., assignors to Jas. P. Marsh Corporation, Chicago, Ill., a corporation of Illinois Application November 4, 1936, Serial No. 109,078

11 Claims. (Cl. 73—369)

This invention relates to thermometers, and more particularly to so-called testing thermometers for remote reading whereby the temperature of refrigerators and the like may be read from outside the refrigerator and while the door is closed.

It is an object of the present invention to provide a small compact testing thermometer having an elongated capillary tube and thermostatic bulb associated therewith, whereby the thermostatic bulb may be placed in a refrigerator and the door closed on the tube extending therefrom, and the instrument may be read from outside the refrigerator. The device is constructed and arranged to be packed in a service kit and to occupy very little space. When in use the casing may be placed on the top of the refrigerator, where the dial may be observed conveniently, and means is provided to prevent injury to any surface on which it is placed.

A further object is the provision of a small compact index thermometer adapted for the use of refrigerator service men, in which the elongated capillary tube and thermostatic bulb thereon may be stored within the casing and may easily be extended therefrom when the instrument is to be used.

A further object is the provision of a distant reading testing thermometer having a Bourdon tube or equivalent pressure responsive element connected to the conventional gauge mechanism and a dial having a pointer or other movable member associated therewith for registering the temperature, whereby variation in pressure responsive to temperature changes may accurately be indicated by the pointer.

Another object is the provision of a testing thermometer in which an elongated capillary tube, attached to the temperature responsive element, is provided at its opposite end with a suitable thermostatic bulb and in which the entire device may be of few parts, cheap to manufacture, easy to assemble, convenient in use, and which will not easily get out of order and also in which the thermostatic bulb and connecting capillary tube may all be coiled within the casing when not in use.

Further objects will be apparent from the specification and the appended claims.

In the drawings,

Figure 1 is a perspective view of the testing thermometer with the capillary tube and thermostatic bulb extended for use;

Fig. 2 is a side elevation of the embodiment illustrated in Fig. 1, a portion being broken away for purposes of illustration;

Fig. 3 is a back view of the embodiment illustrated in Figs. 1 and 2 with the cover removed and the capillary tube extended and broken away;

Fig. 4 is a back view similar to that shown in Fig. 3 with the capillary tube and thermostatic bulb stored within the casing;

Fig. 5 illustrates a slightly different form of thermostatic bulb;

Figure 6:
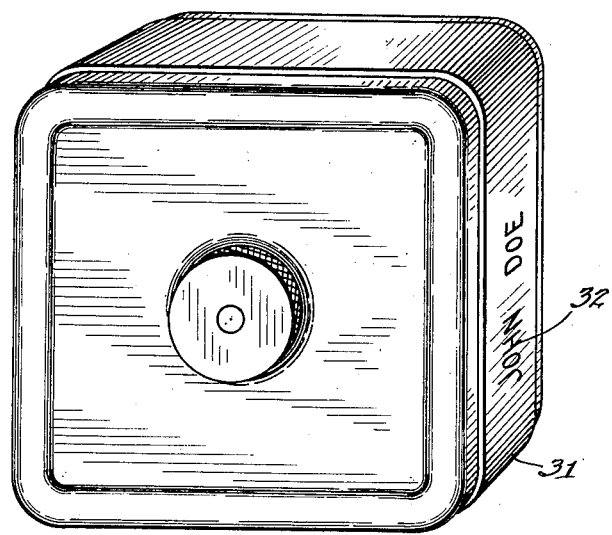
Fig. 6 is a perspective back view of a preferred embodiment of the invention.

Referring to the drawings in detail, the embodiment illustrated comprises a body portion formed of a plurality of casings 1 and 2. These casings may be ordinary gauge casings placed back to back and secured together to form chambers 3 and 4, respectively, and a partition 5 therebetween. The casing 1 is provided with a bracket 6 therein rigidly secured to the back of the casing by any suitable means and provided with a rectangular portion 7 extending through the wall of both casings, which latter are provided with corresponding openings so that the casings and bracket may be accurately aligned. The casing 2 may be secured to this bracket by means of suitable screws 8 extending through both casings.

The bracket 6 is arranged to support a Bourdon tube 9 and the usual indicator mechanism, indicated generally by the reference character 10 operatively connected thereto. The mechanism is provided with the usual indicating needle or pointer 11 which is arranged to travel over the graduations on a suitable dial 12. The dial may also be supported on the bracket 6 by means of screws 13 and a glass or other transparency 14 is retained in position over the dial by means of a flanged bezel 15.

The rear casing 2 may be identical with the casing 1 with the exception that it is provided on one side adjacent its edge with a notch or slot 16 to permit an elongated capillary tube 17 to be extended therethrough. The capillary tube 17 is of comparatively small diameter and is covered over substantially its entire length with a soft rubber tubing or other covering 18. The capillary tube is normally stored within the chamber 4 and one end is connected to the Bourdon tube 9 in the usual manner as illustrated by dotted lines in Fig. 2.

The casing 2 is provided with a flanged cover 19 and the flanges of this cover are provided with notches 20 to receive thumb screws 21 which are threaded into the casing 2. It will be apparent that these thumb screws may secure the cover snugly in place and the cover may be easily removed for extending or storing the tube in a manner to be described later.

A thermostatic bulb 22 is secured to the free end of the capillary tube 17, which latter may be as long as desired for the purposes required. The thermostatic bulb 22 is preferably in a hook form as illustrated in Figs. 1 and 4, so that it may be easily inserted in the casing 2 and so that it may be suspended from any convenient part of the interior of a refrigerator. The capillary tube 17 and its associated covering 18 are very flexible and when the device is not in use the tube may be coiled up somewhat as illustrated in Fig. 4 and the tube and thermostatic bulb may be inserted in the casing 2 and the cover applied and secured by means of thumb screws 21.

It will be apparent that the embodiment illustrated may be very easily and cheaply constructed as the same gauge housing may be used for two purposes, that is, the housing 1 completely encloses the gauge mechanism while a substantially identical housing 2 is arranged to enclose the tube and bulb when the device is not in use. It will therefore be seen that there is a considerable saving in cost of manufacture, as the same tools may be used to form both housings and also the same tools are used for forming the covers with the exception that the central portion of the cover is punched out to form the bezel 15, and the casing 2 is properly notched for the purpose described.

The thermostatic bulb may, of course, be made of any desired shape such as shown in either Fig. 1 or 5 whereby it may be easily inserted in the casing. The hook form shown in Fig. 1 is preferable as it enables the device to be positioned in any desired location in a refrigerator or it may be hooked over the coils or onto the freezing chamber. In use the tube and thermostatic bulb thereon are completely extended and the bulb placed in the desired position in the refrigerator and the door is then closed on the tube. The small diameter of the capillary tube and the soft rubber covering thereon enable the door to be easily closed because of the flexible sealing strip ordinarily used on refrigerator doors. The temperature may then be accurately read on the dial and after the reading the tube and thermostatic bulb are replaced in the casing and the cover secured as previously described. The construction is particularly adapted to provide a small and compact device which may be easily carried in a workman's kit.

The thermostatic bulb 22 may, of course, be of any desired shape, one form being shown in Fig. 5 in which it is bent at a right angle to enable it to be inserted in the chamber 4.

Figure 7:
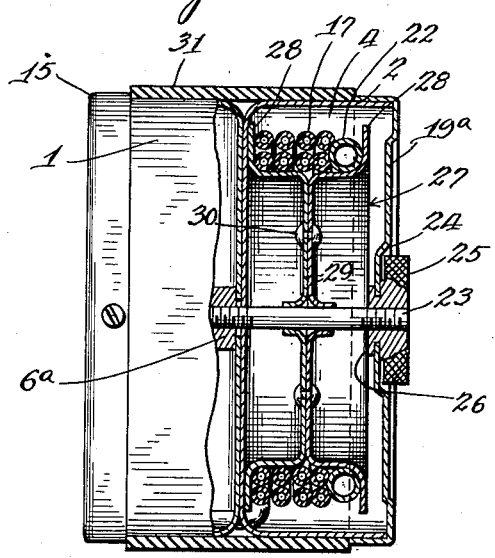
Fig. 7 is a side view, partially in axial section, of the embodiment shown in Fig. 6.

A preferred form of the device is illustrated in Figs. 6 and 7, in which the bracket 6 may be provided with an upwardly extending portion 6a to which is secured, by threading or otherwise, an axial post 23 which is threaded at its outer end as illustrated. The cover 19a is similar to cover 19, previously described, but is provided with a depressed portion 24 having an axial opening therein, in which a thumb screw 25 is rotatably mounted. This thumb screw is freely rotatable in the cover 19a, and its inner end is provided with a flange 26 loosely spun over the edges of the opening so that the thumb nut is carried by the cover, but is freely rotatable therein. It will be apparent that the cover 19a may be securely clamped in position by means of the thumb nut 25 threaded on the post 23.

A spool 27 is rotatably and removably mounted on the post 23, and may comprise interchangeable sheet metal members 28 having their inner webs 29 secured together by rivets 30 or in any suitable manner such as by spot-welding. The capillary tube 17 and thermostatic bulb 22 may be wound thereon, and when the instrument is not in use the spool and tube may be stored in the chamber 4 as illustrated and the cover 19a securely held in position by means of thumb nut 25. When it is desired to use the device, the cover may be easily removed by unscrewing the thumb nut. The spool may then be removed and the tube extended for use.

A comparatively thick continuous band 31, of rubber or other suitable material, may be mounted around the body of the device and preferably between the cover 19a and the flanged bezel 15. This band is for the purpose of providing a cushion of soft material whereby the device may be placed upon any surface such as the top of a refrigerator without injury thereto. The user's name may be placed on this band, if desired, as indicated at 32 in Fig. 6. It will be understood, of course, that this cushion and also the spool may be used on the embodiment previously described, if desired.

Modifications may be made without departing from the spirit of the invention, and it is desired, therefore, that the invention be limited only by the prior art and the scope of the appended claims.

Having thus described this invention, what is claimed and desired to be secured by Letters Patent is:

1. A thermometer comprising a housing having a dial on one side and a removable cover on the other side, an index gauge in said housing adjacent said dial, an elongated capillary tube terminating in a thermostatic bulb operatively communicating with said index gauge, an axial stud in said housing, a removable spool on said stud, said tube normally being wound on said spool, and means on said cover cooperating with said stud to releasably retain said cover.

2. A thermometer comprising standard cup-like gauge housings secured back to back to form a partition therebetween, a pressure gauge in one of said housings, and an elongated capillary tube having a thermostatic bulb thereon normally stored in the other housing and operatively connected to said gauge and capable of being fully extended from said other housing.

3. A housing for a thermometer of the character described comprising two standard cup-like gauge casings secured together back to back to form a partition therebetween, and a removable cover for at least one casing, said partition having an opening therethrough for a capillary tube.

4. A casing for a service thermometer of the character described comprising two standard cup-like gauge housings secured together back to back to form a partition therebetween, a removable cover for at least one housing and a comparatively thick rubber-like band around said casing and arranged to prevent metallic contact with a support surface.

5. A thermometer comprising standard cup-like gauge housings secured back to back to form a partition therebetween, a pressure gauge in one of said housings, and an elongated capillary tube having a thermostatic bulb thereon normally stored in the other housing and operatively connected to said gauge and capable of being fully extended from said other casing, said bulb being longer than any internal dimension of said other housing and of a shape to be received therein.

6. A thermometer comprising standard cup-like gauge housings secured back to back to form a partition therebetween, a pressure gauge in one of said housings, and an elongated capillary tube having a thermostatic bulb thereon normally stored in the other housing and operatively connected to said gauge and capable of being fully extended from said other casing, said bulb being longer than any internal dimension of said housing and formed in a hook-shape whereby it may be hooked to and suspended from any convenient part of the interior of a refrigerator.

7. A portable testing thermometer comprising cup-like housings secured back to back to form two chambers with a partition therebetween, a gauge mechanism in one of said chambers, means for supporting said gauge mechanism on said partition, said supporting means being arranged to secure said housings together, and an elongated capillary tube normally stored in the other chamber and operatively connected to said gauge mechanism and capable of being extended from said other housing.

8. A portable testing thermometer comprising cup-like housings secured back to back to form two chambers with a partition therebetween, a gauge mechanism in one of said chambers, a bracket for supporting said gauge mechanism on said partition, said bracket and said partition having interengaging portions for aligning said housings, means for securing said bracket to said partition and securing said housings together, and an elongated capillary tube normally stored in the other chamber and operatively connected to said gauge mechanism and capable of being extended from said other housing.

9. A portable testing thermometer having a housing comprising two compartments separated by a common partition, one of said compartments being formed by a rearwardly extending portion of said housing and adapted to house normally a capillary tube and an associated thermostatic bulb, an index gauge disposed in the other of said compartments, an elongated flexible capillary tube terminating in a substantially rigid hook-shaped thermostatic bulb that are both normally disposed in said first compartment and which may be extended therefrom whereby the said bulb may be made accessible to hook it onto any convenient part of a device to be tested, and said capillary tube being operatively connected through said common partition with said index gauge, and a compressible protective covering for said capillary tube.

10. A testing instrument comprising two cup-like housings secured back to back to form a common partition therebetween, a pressure gauge disposed in one of said housing, an elongated capillary tube normally stored in the other housing and operatively connected at one end to said pressure gauge and capable of being fully extended from said other housing, a resilient protective covering for said capillary tube, and a thermostatic bulb operatively connected to the other end of said capillary tube whereby said bulb is rendered accessible to contact with any object to be tested.

11. A testing instrument having a casing comprising two cup-shaped housings secured back to back to form two adjacent chambers for testing elements with a partition therebetween, and a shock absorbing member around said casing and subtending the joint between said cup-shaped housings for the purpose of concealing the same and for cushioning the testing elements from mechanical shocks.

REYNOLD T. HEDFIELD.
HANS SEEGERS.